US008443857B2

(12) United States Patent
Doney et al.

(10) Patent No.: US 8,443,857 B2
(45) Date of Patent: May 21, 2013

(54) PROCESS OF THERMAL TRANSFER USING HOT MELT ADHESIVE LAMINATION FOR FORMING A CARPET BACKING AND FINISHED CARPET OR TILE PRODUCT

(75) Inventors: Grant William Doney, Surrey (CA); Roger Harris, Dalton, GA (US); Robert Keith Salsman, Hoschton, GA (US)

(73) Assignee: Beaulieu Group, LLC, Dalton, GA (US)

( * ) Notice: Subject to any disclaimer, the term of this patent is extended or adjusted under 35 U.S.C. 154(b) by 17 days.

(21) Appl. No.: 13/237,706

(22) Filed: Sep. 20, 2011
(Under 37 CFR 1.47)

(65) Prior Publication Data

US 2012/0067526 A1    Mar. 22, 2012

Related U.S. Application Data

(60) Division of application No. 11/779,019, filed on Jul. 17, 2007, now Pat. No. 8,021,506, which is a continuation of application No. 11/242,133, filed on Oct. 4, 2005, now abandoned.

(60) Provisional application No. 60/614,966, filed on Oct. 4, 2004.

(51) Int. Cl.
*B29C 65/52*  (2006.01)
*D05C 17/02*  (2006.01)

(52) U.S. Cl.
USPC .................... 156/435; 156/498; 156/582

(58) Field of Classification Search
USPC ............. 156/72, 435, 498, 500, 582, 583.1
See application file for complete search history.

(56) References Cited

U.S. PATENT DOCUMENTS

| | | | |
|---|---|---|---|
| 3,317,366 A | 5/1967 | Dionne | |
| 3,537,946 A * | 11/1970 | Montagnino et al. | 428/97 |
| 3,551,231 A | 12/1970 | Smedberg | |
| 3,565,710 A | 2/1971 | Garvin | |
| 3,583,936 A | 6/1971 | Stahl | |
| 3,718,530 A | 2/1973 | Watson | |
| 3,810,807 A | 5/1974 | Jackson et al. | |
| 3,940,525 A | 2/1976 | Ballard | |
| 3,949,124 A | 4/1976 | Jilla | |
| 3,962,012 A | 6/1976 | Schumacher | |
| 4,379,730 A | 4/1983 | Anderson et al. | |
| 4,576,665 A | 3/1986 | Machell | |
| 4,844,765 A | 7/1989 | Reith | |
| 5,538,776 A | 7/1996 | Corbin et al. | |
| 5,726,277 A | 3/1998 | Salsman | |
| 6,479,125 B1 | 11/2002 | Irwin, Sr. | |
| 6,503,595 B1 | 1/2003 | Kim et al. | |
| 8,021,506 B2 | 9/2011 | Doney et al. | |

(Continued)

FOREIGN PATENT DOCUMENTS

| | | |
|---|---|---|
| JP | 50-63208 | 5/1975 |
| JP | 50-15014 B | 6/1975 |
| WO | 95/14806 A1 | 6/1995 |
| WO | 2004/025018 A1 | 3/2004 |

*Primary Examiner* — Michael Tolin
(74) *Attorney, Agent, or Firm* — Sutherland Asbill & Brennan LLP (57) ABSTRACT

A method for binding a greige carpet and a secondary backing material using a hot melt adhesive is disclosed. A heated application roll may be provided and the secondary backing material may be contacted with the hot melt adhesive and greige carpet and pressed against the heated application roll.

20 Claims, 4 Drawing Sheets

U.S. PATENT DOCUMENTS

| | | |
|---|---|---|
| 2001/0008673 A1 | 7/2001 | Nagata et al. |
| 2002/0193474 A1 | 12/2002 | Daily et al. |
| 2003/0211280 A1 | 11/2003 | Brumbelow et al. |
| 2004/0079468 A1 | 4/2004 | Reisdorf et al. |
| 2005/0234213 A1 | 10/2005 | Salsman et al. |
| 2006/0281851 A1 | 12/2006 | Salsman |
| 2008/0236443 A1 | 10/2008 | Salsman |
| 2009/0022936 A1 | 1/2009 | McGill |

* cited by examiner

PROCESS OF THERMAL TRANSFER USING HOT MELT ADHESIVE LAMINATION FOR FORMING A CARPET BACKING AND FINISHED CARPET OR TILE PRODUCT

CROSS-REFERENCES TO RELATED APPLICATIONS

This application is a division of U.S. patent application Ser. No. 11/779,019, filed Jun. 17, 2007, now U.S. Pat. No. 8,021,506, which is a continuation of U.S. patent application Ser. No. 11/242,133, filed Oct. 4, 2005, now abandoned. Priority is claimed to U.S. Provisional Application No. 60/614,966, filed Oct. 4, 2004. The disclosures of these applications are incorporated herein by reference.

TECHNICAL FIELD

Embodiments of the invention relate generally to finishing systems for tufted primary backing carpets and more specifically to systems that bind greige carpet and secondary backing material using hot melt adhesives.

BACKGROUND

The primary component of conventional broadloom carpet products such as carpet tiles is tufted "greige" carpet. Greige carpet generally comprises fiber tufts looped around a primary backing fabric. Primary backing fabrics may be woven, nonwoven, or spun bonded natural or synthetic materials. The tufted loops of fiber may be left intact or sheared so that the upright face fibers, or pile, are left with random ends facing outwards on the visible wear surface, or face side, of the carpet.

In order to more permanently secure the fiber tufts looped around the primary backing fabric and provide dimensional stability to the finished product, secondary backing materials may be applied to the back side of the greige carpet.

Common secondary backing materials include latex, urethanes, thermal plastics such as PVC, and modified olefin-based thermal formable plastics. Additionally, woven materials such as oriented polypropylene, polyesters, jute, and other nonwoven felted type materials may be used as secondary backing materials. A variety of additives intended to impart other desirable characteristics to the finished carpet, including resistance to fuzzing (individual fibers pulling loose during usage), moisture impermeability, fire retardency, sound absorbency, and antibacterial properties also may be added as secondary backing materials.

Secondary backing materials may be secured to the greige carpet using, for example, a hot melt adhesive. Additionally, hot melt adhesives may perform other beneficial functions when applied to greige carpet. For example, if the hot melt adhesive is able to penetrate into the fiber tufts during application, then the adhesive may help secure the fiber tufts to the primary backing material and prevent fuzzing. Also, hot melt adhesives may impart additional mechanical strength to the greige carpet.

For example, U.S. Pat. No. 6,503,595, the disclosure of which is incorporated herein by reference in its entirety, discloses a carpet that includes a primary backing having tufts of synthetic carpet fibers protruding from a top surface and, optionally, a secondary backing with an extruded sheet of a polyolefin polymer between the primary and secondary backing. The polyolefin sheet adheres to the primary and secondary backings, thereby fusing the two together.

In order to facilitate the penetration of the hot melt adhesive into the tufted fiber bundles of the greige carpet, it may be desirable to chose an adhesive that has a low viscosity but at a relatively low temperature. However, such an adhesive often does not have adequate mechanical strength to impart dimensional stability to the greige carpet. Conversely, mechanically stronger adhesives often attain low viscosity only at higher temperatures, necessitating application of the adhesive at higher temperatures. Higher process temperatures may cause the greige carpet to shrink and may damage the primary backing material and fiber tufts, resulting in a loss of finished carpet and increased manufacturing costs. The dichotomy between low viscosity and low application temperature sometimes makes application of hot melt adhesives difficult.

Several methods have been utilized in an attempt to overcome the difficulties associated with applying hot melt adhesives to greige carpet and secondary backing materials.

For example, in order to avoid higher process temperatures and associated damage to the greige carpet, hot melt adhesives with higher viscosities (and therefore greater mechanical strength) may be applied to a greige carpet and pressed into the fiber tufts by means of high pressures. For example, the greige carpet may be coated with a hot melt adhesive that is heated but only to a temperature sufficiently low to avoid damaging the greige carpet. The hot melt adhesive coated greige carpet then is nipped at high pressure. Nipping at pressures, however, may result in distortion of the carpet because of the flattening of the fiber tufts at the face side of the carpet.

For example, U.S. Pat. App. No. 2002/0193474, the disclosure of which is incorporated herein by reference in its entirety, discloses a modified hot melt adhesive which is applied in an extruded form. The hot melt backing is nipped under high pressure against a cool roller, thereby flattening and cooling the yarn loops.

Additionally, U.S. Pat. No. 4,576,665, the disclosure of which is incorporated herein by reference in its entirety, provides a hot melt adhesive bonded pile fabric that comprises a liquid permeable base layer and a pile forming yarn adjacent to the base layer but not tufted through the base layer, the pile forming element having been bonded to the base layer by means of a hot melt adhesive applied to the back of the base layer. The hot melt adhesive applied to the back of the base layer is forced through the permeable base layer using an applicator roll to apply pressure.

Alternatively, U.S. Pat. No. 3,962,012, the disclosure of which is incorporated herein by reference in its entirety, teaches a process for laminating a primary and a secondary sheet that seeks to avoid damaging the face side of the primary sheet by applying an adhesive to the back side of the primary sheet or to the mating side of the secondary sheet, or to both, contacting the mating side of the secondary sheet with the back side of the primary sheet, and firmly pressing together the two sheets while avoiding the application of any pressure to the pressure-sensitive face side of the primary sheet until at least 50 percent of the terminal bond strength is developed. The two sheets are firmly pressed together by maintaining the primary and secondary sheets taut and applying pressure from the back side of the secondary sheet.

Instead of the use of pressure, the hot melt adhesives may be applied at higher temperatures so that the adhesive is less viscous. This may be accomplished, for example, using heated lamination rolls. However, heated lamination rolls are often sullied by loose fibers that adhere to the roll, therefore necessitating shut down for cleaning.

In another alternative, multi-layered hot melt adhesives may be utilized. One of the layers is typically a low-melting point adhesive that easily infiltrates the fiber tufts attached to the primary backing material. The other layer is typically a high-melting point adhesive that imparts additional mechanical strength to the greige carpet. Forming a multi-layered hot melt adhesive, however, may introduce additional complexity and cost into the manufacturing process.

For example, WO 2004/025018, the disclosure of which is incorporated herein by reference in its entirety, describes a process for marrying a secondary backing material with an unfinished tufted primary carpet using a hot melt adhesive. The hot melt adhesive comprises two adhesive layers applied by contiguous extrusion—a lower viscosity layer to lock the fibers in place and a higher viscosity layer to thicken and flatten the entire adhesive coating. The lower viscosity layer of hot melt adhesive is intended to be pressed into and around the fiber roots.

Another method to apply hot melt adhesives is to pre-form an adhesive layer before applying the adhesive layer to the greige carpet and secondary backing material. Again, preforming an adhesive layer may introduce additional complexity and cost in the manufacturing process.

For example, U.S. Pat. No. 6,479,125, the disclosure of which is incorporated herein by reference in its entirety, teaches the production of a finished carpet employing a multitude of layers. A heated film of thermofusible bonding material with a lower melting point than that of the primary carpet and backing materials is used to encapsulate the layers without excessively heating the fibers or layers themselves. However, the film must be preformed in order to have consistent weight distribution across the carpet.

U.S. Pat. No. 4,844,765, the disclosure of which is incorporated herein by reference in its entirety, teaches the lamination of a tufted primary carpet into a finished product with the use of hot melt adhesive in sheet form. The sheet of hot melt adhesives is preformed and subsequently laminated between the unfinished primary tufted carpet and the secondary backing while at an elevated temperature.

Several other patents teach other methods to produce finished broadloom carpet using hot melt adhesives. For example, U.S. App. No. 2003/0211280, the disclosure of which is incorporated herein by reference in its entirety, provides a method of making a carpet comprising a greige carpet and an adhesive backing material. The adhesive backing material is applied to the greige carpet by extrusion coating and at least one additional step selected from (a) preheating the greige good prior to the application of the adhesive backing material, (b) subjecting the adhesive backing material to a vacuum to draw the adhesive backing material onto the back side of the primary backing material, (c) subjecting the adhesive backing material to a positive air pressure device in addition to nip roll pressure to force the adhesive backing material onto the back side of the primary backing material, and (d) heat soaking the carpet after application of the adhesive backing material onto the back side of the primary backing material.

The description herein of problems and disadvantages of known apparatus, methods, and compositions is not intended to limit the invention to the exclusion of these known entities. Indeed, embodiments may include one or more of the known apparatus, methods, and compositions without suffering from the disadvantages and problems noted herein.

SUMMARY OF THE INVENTION

It therefore would be desirable to bind a greige carpet with a secondary backing material using a hot melt adhesive in a single-pass process that provides for excellent penetration of the hot melt adhesive into the yarn fiber tufts of the greige carpet while minimizing shrinkage and general deterioration of the greige carpet. It also would be desirable to provide a process of making a secondary backing material the provides improved fire retardancy for the carpet material, and preferably so that the carpet materials pass a Class 1 fire rating.

Therefore, in accordance with one embodiment, there is provided a method for binding a greige carpet with a secondary backing material using a hot melt adhesive. The method provides for a heated application roll. The hot melt adhesive may be applied to the secondary backing material to form an adhesive-loaded secondary backing material. The adhesive-loaded secondary backing material then can be contacted with the heated application roll to form a secondary backing material on the heated application roll. The greige carpet preferably is pressed against the secondary backing material on the heated application roll to form a finished carpet.

In accordance with another embodiment, there is provided an apparatus for producing carpet. The apparatus comprises a heated application roll; a means for providing a greige carpet to the heated application roll; a means for providing a secondary backing material to the heated application roll, the means being positioned upstream of the heated application roll from the means for providing the greige carpet; a means for providing a hot melt adhesive to the secondary backing material; at least one unheated nip roll positioned adjacent to the heated application roll where the greige carpet first contacts the heated application roll; a chill roll positioned downstream from the heated application roll; an idler tension roll positioned adjacent to the chill roll; and a means for collecting a finished carpet positioned downstream from the chill roll.

Still further features and advantages of the present invention are identified in the ensuing description, with reference to the drawings identified below.

BRIEF DESCRIPTION OF THE DRAWINGS

FIG. 3, embodiments A and B, are illustrations of an exemplary configuration of the heated application roll and two unheated adjustable nip rolls positioned adjacent to the heated application roll.

DETAILED DESCRIPTION OF THE INVENTION

The following description is intended to convey a thorough understanding of the embodiments by providing a number of specifically preferred embodiments and details involving the binding of greige carpet and secondary backing materials using hot melt adhesives. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments.

One embodiment is a method for binding a greige carpet comprising a face side and a back side with a secondary backing material using a hot melt adhesive. The hot melt adhesive can be applied to the secondary backing material to form an adhesive-loaded secondary backing material. The adhesive-loaded secondary backing material then can be contacted with a heated application roll to form a secondary backing material on the heated application roll. The back side of the greige carpet then preferably is pressed against the secondary backing material on the heated application roll to form a finished carpet.

The greige carpet may comprise, for example, a primary backing fabric and fiber tufts wound around the primary backing fabric. The fiber tufts may be composed of any applicable material. However, the fiber tufts preferably are composed of nylon, polyester, acrylic, rayon, polyolefins such as polypropylene, polyethylene, etc., wool, or cotton fibers, and combinations or mixtures thereof. The backing material likewise may be composed of any applicable material. Preferred compositions of the primary backing material include, but are not limited to, nonwoven or woven polyesters, polypropylene, nylon fabrics, and combinations or mixtures thereof. Additionally, the primary backing material may comprise straight stitched, side stitched, cross stitched, or other woven fabrics that are difficult for the hot melt adhesive to penetrate in traditional binding processes.

The secondary backing material also may be composed of any applicable material, in accordance with the principles of the invention. Woven or nonwoven polyester, polypropylene, nylon-coated polyester fibers, and combinations or mixtures thereof are preferred materials for the secondary backing material. Single layer and multi-layered secondary backing materials may be used in embodiments of the invention. A thermoset polyester is a more preferred material for use as the secondary backing material. A woven textile with thread counts between 10 and 200 threads per inch in both the warp and weft directions is another preferred material for use as the secondary backing material. Even more preferred is a woven secondary backing material with a thread count between 20 and 80 threads per inch in both the warp and weft directions.

It may be desirable that the secondary backing material be resistant to dimensional distortion at higher temperatures. Therefore, a secondary backing material that exhibits dimensional thermal stability at temperatures up to 350° F. is preferred. Dimensional thermal stability means that the secondary backing material shrinks less than 5% each in the warp and weft directions at that temperature.

The hot melt adhesive also may be any applicable hot melt adhesive. One skilled in the art will recognize the many different hot melt adhesives that are applicable in the manufacture of carpet materials, using the guidelines provided herein. Preferred hot melt adhesives are esters of polyethylene terephthalate (PET) and a modifying polymer. Other preferred hot melt adhesives are esters of polyethylene naphthalate (PEN) and a modifying polymer. The modifying polymer, for example, may be one or more of polyethylene glycol, diethylene glycol, trimethylol propane, phthalic anhydride, adipic acid, and combinations or mixtures thereof. Additionally, esterification catalysts may be added to the mixture in order to promote esterification of the modifying polymers and trans-esterification with PET and PEN. For example, a mixture of 3.63% by weight of polyethylene glycol, 1.82% diethylene glycol, 17.20% trimethylol propane, 12.29% adipic acid, 0.08% Fascat® 4100 esterification catalyst (commercially available from Atofina Chemicals, Inc., Philadelphia, Pa.), 0.02% Tyzor® TPT trans-esterification catalyst (commercially available from Dupont, Wilmington, Del.), and 64.96% PET is a preferred mixture of modifying polymers, PET, and esterification catalysts that may be used as a hot melt adhesive. Another preferred modified PET hot melt adhesive would include PET and a combination of oleic acid, adipic acid, trimethylol propane, PEG, diethylene glycol, Fascat® 4100 esterification catalyst (commercially available from Atofina Chemicals, Inc., Philadelphia, Pa.), hydroquinone, and BNX® 1225 (an antioxidant commercially available from Mayzo Chemicals, Norcross, Ga.). Suitable hot melt adhesives prepared from modified PET and PEN are disclosed in U.S. Pat. No. 7,157,139, entitled: "Polymer Manufacturing Process," the disclosure of which is incorporated by reference herein in its entirety.

The hot melt adhesive may be mixed with additives to impart additional beneficial qualities to the finished carpet. Applicable additives include, but are not limited to, fire retardants, fillers such as magnetite and other fillers, weighters, oxidization stabilizers, antibacterial agents, antimicrobial agents, antifungal agents, UV stabilizers, and combinations or mixtures thereof. One skilled in the art will recognize other applicable additives that may optionally be added to the hot melt adhesive, in accordance with the guidelines provided herein.

Inclusion of sufficient fire retardant to satisfy Class 1 fire standards, particularly in reference to commercial applications of the finished carpet, is a more preferred additive to the hot melt adhesive. Any fire retardant can be used. For example, a fire retardant may be added in large concentrations so as to attain a Class 1 fire rating. Because the embodiments described herein may be less susceptible to changes in the viscosity of the hot melt adhesive, for example changes in viscosity as a result of the inclusion of additives in the hot melt adhesive mixture, greater amounts of additives may be added than has sometimes traditionally been the case.

Nevertheless, lower viscosity hot melt adhesives may more fully penetrate the fiber tufts of the greige carpet. Therefore, it is preferred that the hot melt adhesive have a viscosity of less that 250,000 centipoise 325° F. More preferred is a hot melt adhesive that has a viscosity of less 50,000 centipoise at 325° F.

The hot melt adhesive preferably is applied to the secondary backing material to form an adhesive-loaded secondary backing material. Applying the hot melt adhesive to the secondary backing material may take place in any applicable manner. For example, the hot melt adhesive may be sprayed or rolled on the secondary backing material. The hot melt adhesive may be applied in one application, or multiple applications to provide a multi-coated secondary backing material.

In a preferred method for applying the hot melt adhesive to the secondary backing material, a heated doctor bar may be positioned generally above the point of contact between the secondary backing material and the heated application roll in order to regulate the amount of hot melt adhesive that is contacted with the secondary backing material. The heated doctor bar may cause a puddle of hot melt adhesive to form on and seep into the secondary backing material. In this way, the heated doctor bar may apply a smooth, continuous, and highly concentrated layer of hot melt adhesive to the secondary backing material in a single application.

Coating weights of 120 ounces of hot melt adhesive per square yard of secondary material are traditionally difficult to attain. Higher coating weights, for example about 240 ounces of hot melt adhesive per square yard of secondary material, however, may be attainable through embodiments of the invention. A coating weight of between 4 and 240 ounces of hot melt adhesive per square yard of secondary backing material is preferred, more preferably the coating weight is within the range of from about 80 to about 240 ounces per square yard, and most preferably from about 120 to about 240 ounces per square yard. This may be advantageous because increased concentrations of hot melt adhesive may aid in securing together the greige carpet and secondary backing material, thereby preventing delamination of the finished carpet. Additionally, achieving a high coating weight of hot melt adhesive in a single application step may eliminate the need to apply the hot melt adhesive in multiple steps. The position of the heated doctor bar may be variable in order to allow a variable amount of hot melt adhesive to be applied to the secondary backing material.

The hot melt adhesive may be delivered to the doctor bar or blade by, for example, a heated extrusion die extending the width of the heated application roll. Because the extrusion die extends the width of the heated application roll, a more uniform application of hot melt adhesive across the width of the secondary backing material may occur.

The hot melt adhesive may be heated during application to the secondary backing material in order to attain a lower viscosity. A lower viscosity may be advantageous because, at lower viscosities, the hot melt adhesive may more easily penetrate the secondary backing material. For example, the hot melt adhesive may be heated in a heating vessel before being extruded through the heated extrusion die and delivered to the heated doctor bar. Because the extrusion die and doctor bar both are heated, the hot melt adhesive is less likely to cool significantly before application to the secondary backing material.

Additionally, because the heated hot melt adhesive may emit toxic fumes, a vacuum may be drawn on the hot melt adhesive in order to capture the fumes. The temperature to which the hot melt adhesive is warmed may be chosen to be low enough so as to avoid degradation of the fiber tufts of the greige carpet and dimensional distortion of the greige carpet that might occur at temperatures that are too high. One skilled in the art will appreciate that the choice of temperature to which the hot melt adhesive may be warmed will be dictated, in part, by the choice of greige carpet, secondary backing material, and hot melt adhesive.

The adhesive-loaded secondary backing material preferably is contacted with the heated application roll to form a secondary backing material on the heated application roll. Heating the application roll helps to maintain the elevated temperature of the hot melt adhesive, thereby aiding the penetration of the adhesive into the secondary backing material. Additionally, because the greige carpet is contacted with the secondary backing material on the heated application roll, the greige carpet also may be warmed by the heated application roll. Warming the greige carpet also may aid the hot melt adhesive in penetrating the greige carpet.

Increased penetration of the hot melt adhesive into the secondary backing material and the greige carpet may result in increased adhesion between the two layers. Therefore, multi-layer adhesives may not be required in the embodiments described herein, in order to achieve the desired level of adhesion. Also, increased penetration of the hot melt adhesive into the secondary backing material and the greige carpet may impart additional mechanical strength to the finished carpet, thereby negating the need to apply additional stabilization layers, for example fiberglass backings, to strengthen the finished carpet. Increased penetration of the hot melt adhesive into the greige carpet also may help prevent fuzzing of the tufted fibers during use. Furthermore, increased penetration of the hot melt adhesive may reduce or eliminate the need to force the hot melt adhesive into the greige carpet or secondary backing material by means of pressure, thereby reducing the possibility of the fiber tufts being flattened or crushed under pressure.

Finally, heating the greige carpet and secondary backing materials may help to reduce the 'heat sink' effect of contacting the warm hot melt adhesive with a cool secondary backing material or greige carpet, which would lower the temperature of the hot melt adhesive and deteriorate the flow characteristics of the adhesive. Therefore, the hot melt adhesive may be applied to the secondary backing material at a lower temperature than would be required if the greige carpet and secondary backing material were not heated, thereby reducing the possible distorting effect of the warm hot melt adhesive on the greige carpet. One skilled in the art will appreciate other beneficial effects of heating the greige carpet and secondary backing material by the heated application roll.

If desired, the greige carpet may be separately heated before pressing against the secondary backing material on the heated application roll. This may be accomplished, for example, by radiant or infrared heating of the back side of the greige carpet before pressing against the secondary backing material on the heated application roll. One skilled in the art will recognize other ways in which the greige carpet may be heated prior to pressing against the secondary backing material on the heated application roll.

The back side of the greige carpet preferably is pressed against the secondary backing material on the heated application roll to form a finished carpet. It is preferred that a first and second unheated nip roll adjacent to the heated application roll press the greige carpet against the secondary backing material on the heated application roll in order to effect contact between the two. Additionally, the first and second unheated nip rolls adjacent to the heated application roll may tightly draw the secondary backing material against the heated application roll. The first and second unheated nip rolls may be positioned immediately adjacent to the heated application roll and preferably may be adjustable. In one preferred embodiment, for example, the first and second unheated nip rolls adjacent to the heated application roll are adjusted so that the nip rolls press the greige carpet against the secondary backing material for at least 80% of the heated application roll's surface area. In another preferred embodiment, the first and second unheated nip rolls adjacent to the heated application roll are adjusted so that the nip rolls press the greige carpet against the secondary backing material for less 80% of the heated application roll's surface area. The first and second unheated nip rolls adjacent to the heated application roll may press against the face side of the greige carpet, therefore pressing the back side of the greige carpet against the secondary backing material on the heated application roll.

Because the greige carpet is pressed against the secondary backing material, the greige carpet may never come into direct contact with the heated application roll. This is desirable in order to avoid loose fiber tufts from the primary backing fabric adhering to the heated application roll, which might necessitate periodic cleaning of the heated application roll or possible shut down.

Because the finished carpet may be at an elevated temperature upon exiting the heated application roll, it may be desirable to contact the finished carpet with a chill roll in order to cool the finished carpet and solidify the hot melt adhesive. The finished carpet product may be contacted with the chill roll, for example, by means of an idler tension roll adjacent to the chill roll. The idler tension roll preferably is located a sufficient distance from the chill roll such that fiber tufts that may have been flattened by the idler tension roll may primarily re-orient themselves in the position perpendicular to the primary backing fabric of the finished carpet before contacting the chill roll. By "primarily," it is meant than at least 80%, more preferably 90%, and most preferably 95% of the fiber tufts that might have been flattened by the idler tension roll will re-orient in the position perpendicular to the primary backing fabric of the finished carpet. One skilled in the art will appreciate that other methods by which the finished carpet may be cooled and other alternative configurations of the chill roll may be practiced in accordance with the present invention, in accordance with the guidelines provided herein.

It may be desirable to wind the finished carpet around a means for collecting the finished carpet. The means, for example, may be a final roll, intermediate roll, or other collection mechanism. When an appropriate amount of finished carpet is wound around the final roll, the carpet is cut and the final roll removed and replaced by another final roll, around which more finished carpet then is wound. Other rolls positioned between the chill roll and final roll may make the finished carpet taut during winding around the final roll. It is preferred that the finished carpet be made taut during winding around the final roll in order to maximize the amount of finished carpet that may be wound around the final roll, and to cause the fiber tufts to orient in the perpendicular direction relative to the primary backing fabric of the finished carpet.

If desired, the finished carpet may be cut into carpet tiles and collected as an alternative to the collection means. Alternatively, the finished carpet may be un-wound from the collection means at a later time and cut into carpet tiles.

Figure 1:
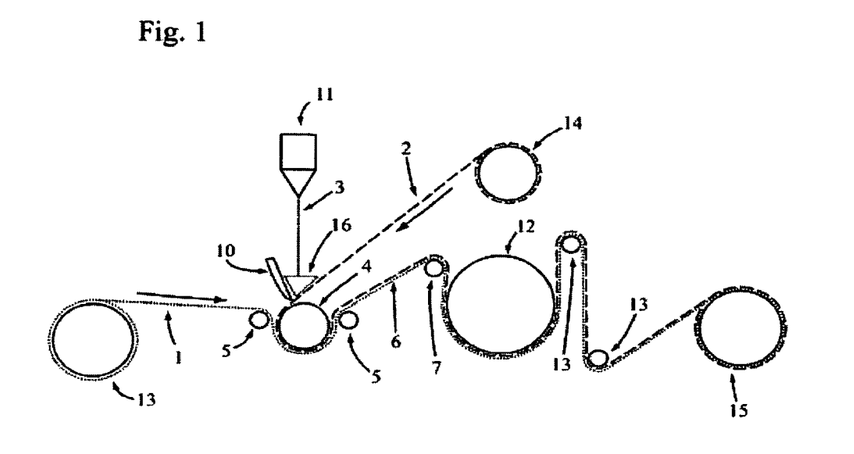
FIG. 1 is an illustration of an exemplary apparatus for the production of carpet.

FIG. 1 illustrates an exemplary apparatus for the production of carpet according to a preferred embodiment. A means for providing a greige carpet 1, for example, may include a roll of greige carpet 13. Likewise, a means for providing a secondary backing material 2, for example, may include a roll of secondary backing material 14. In an alternative embodiment not shown, the greige carpet and secondary backing material may be provided directly from a process for producing the greige carpet or secondary backing material.

A hot melt adhesive 3 preferably is provided by a heated extrusion die 11 extending the width of a heated application roll 4. The hot melt adhesive 3 preferably is applied to the secondary backing material 2 to form an adhesive-loaded secondary backing material, for example, using a heated doctor bar 10 that confines the hot melt adhesive 3 and aids in forcing the hot melt adhesive to penetrate into the secondary backing material 2. For example, a puddle of hot melt adhesive 16 may form in front of the heated doctor bar from which the hot melt adhesive 3 seeps into the secondary backing material 2.

The adhesive-loaded secondary backing material preferably is brought into contact with the heated application roll 4, for example, by means of first and second unheated nip rolls 5 adjacent to the heated application roll to form a secondary backing material on the heated application roll. The greige carpet product 1, also may be pressed against the secondary backing material on the heated application roll to form a finished carpet 6 by means of the first and second unheated nip rolls 5 adjacent to the heated application roll 4.

The finished carpet 6 can be withdrawn from the heated application roll 4 and conveyed to a chill roll 12 by the second unheated nip roll 5 and a idler tension roll 7. The idler tension roll 7 preferably is positioned at a sufficient distance from the chill roll 12 so that the fiber tufts of the finished carpet will not primarily be flattened when they come into contact with the chill roll 12, meaning that at least 80%, more preferably at least 90%, and most preferably at least 95% of the fiber tufts that may have been flattened by the idler tension roll 7 will be re-oriented in the direction perpendicular to the primary backing fabric of the finished carpet 6 before coming into contact with the chill roll 12. The chill roll 12 may cool the finished carpet in order to, for example, set the holt melt adhesive. The finished carpet then preferably is wound around a final roll 15. Other rolls 13 may guide and make the finished carpet taut as it is wound around the final roll 15.

Figure 2:
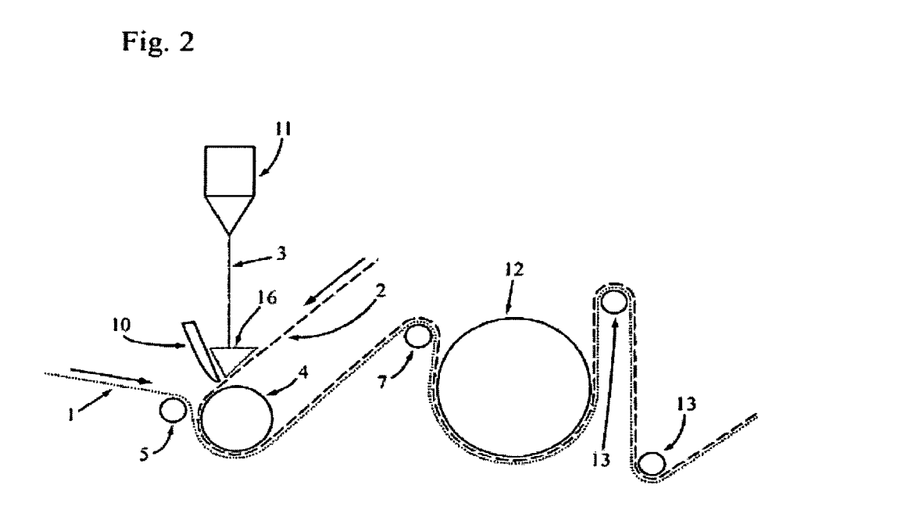
FIG. 2 is another illustration of an exemplary apparatus for the production of the carpet.

FIG. 2 illustrates an alternative apparatus for the production of carpet with one unheated nip roll 5. Like numeral elements of FIG. 2 correspond to the elements identified in reference to FIG. 1.

Figure 3A:
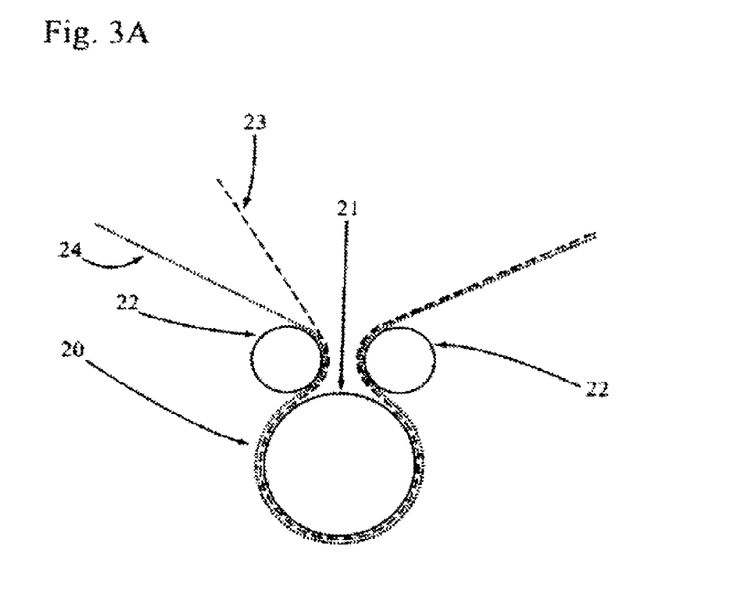

Referring now to FIG. 3, embodiment A, the first and second unheated nip rolls 22 adjacent to the heated application roll 21 are adjustable. The adhesive-loaded secondary backing material 23 is pressed against the heated application roll 21 by the unheated nip rolls 22 to form a secondary backing material on the heated application roll. The greige carpet 24 also is pressed against the secondary backing material on the heated application roll by the unheated nip rolls 22 to form a finished carpet 20. The finished carpet 20 also is pressed against the heated application roll 21 by the unheated nip rolls 22. Because the unheated nip rolls 22 are adjustable, the area of the heated application roll 21 against which the finished carpet 20 is pressed can be varied.

Figure 3B:
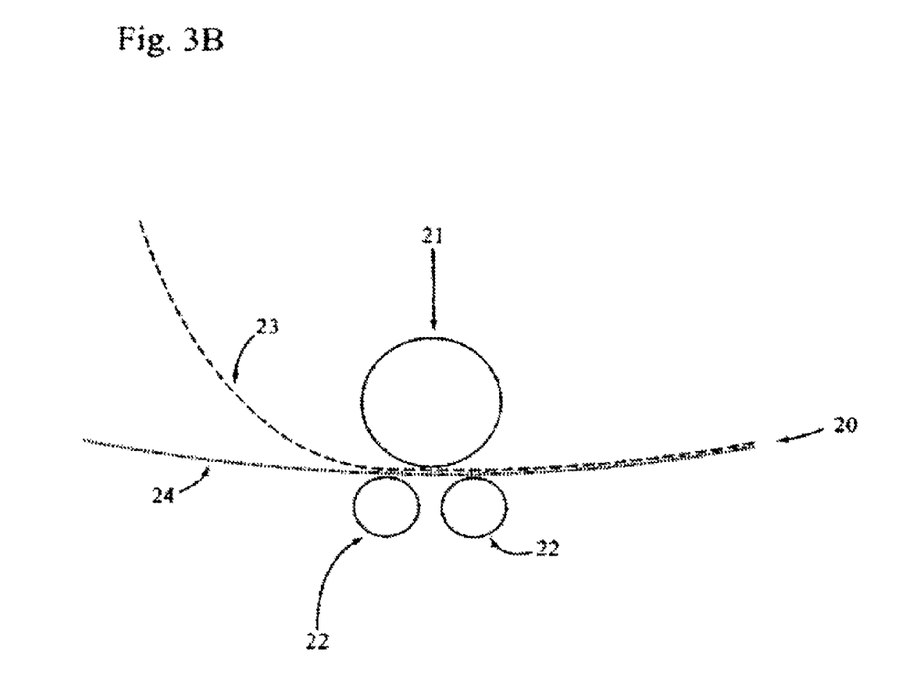

Embodiment B of FIG. 3 illustrates an alternative configuration of the two unheated nip rolls 22. In this embodiment, the unheated nip rolls 22 have been adjusted toward the bottom of the heated application roll 21. Adjusting the nip rolls 22 in this way reduces the surface area of the heated application roll 21 over which the finished carpet 20 is pressed against the heated application roll 21. It should be understood that the unheated nip rolls 22 may be positioned anywhere around the heated application roll 21, not just at the two exemplary positions illustrated in FIG. 3, embodiments A and B.

Figure 4:
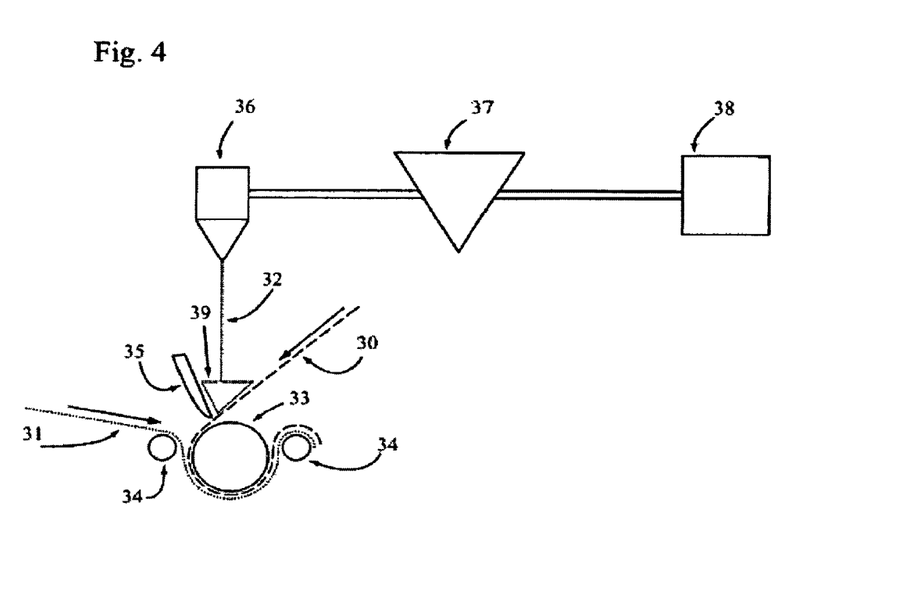
FIG. 4 is an illustration of an exemplary means for providing a hot melt adhesive.

FIG. 4 depicts in greater detail an exemplary means for providing the hot melt adhesive 32 to the secondary backing material 30. The adhesive is heated in a heating vessel 38. A vacuum source 37 applies a vacuum to the heated hot melt adhesive in order to remove volatile vapors that may be released by the heated hot melt adhesive during heating. The adhesive preferably is spread by a heated extrusion die 36 the width of the heated application roll 33. A heated doctor bar 35 preferably captures the stream of hot melt adhesive 32, forming a puddle 39 of hot melt adhesive in front of the heated doctor bar 35. This aids the hot melt adhesive in penetrating the secondary backing material 30 to form an adhesive-loaded secondary backing material. The adhesive-loaded secondary backing material and greige carpet 31 then may be pressed against one another and brought into contact with the heated application roll 33 by means of the first and second unheated nip rolls 34. Those skilled in the art will appreciate that other means for providing the hot melt adhesive may be used, including, for example, extruders, and the like.

Figure 5:
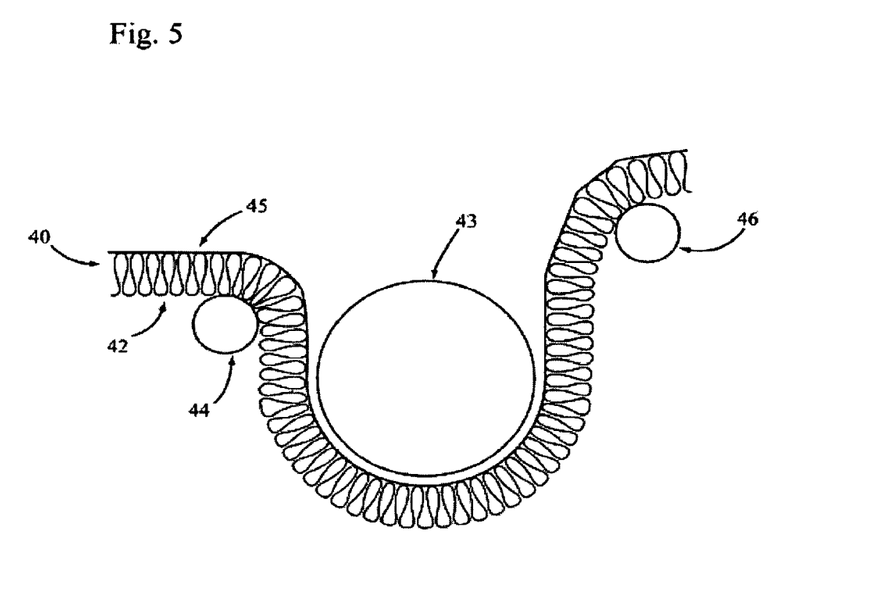
FIG. 5 is an illustration of an exemplary configuration of the chill roll.

FIG. 5 depicts in greater detail an exemplary configuration of the idler tension roll 44 and chill roll 43. The idler tension roll 44 is a sufficient distance from the chill roll 43 so that the fiber tufts 42 of the finished carpet 40 are able to re-orient themselves into a direction perpendicular to the primary backing fabric 45 of the finished carpet before coming into contact with the chill roll 43. In this way, the fiber tufts of the finished carpet are less likely to be in a flattened position when the hot melt adhesive is cooled and set. Otherwise, if the hot melt adhesive is cooled when the fiber tufts are in a flattened position, the fiber tufts may be locked into that position, resulting in a general degradation of the quality of the finished carpet. Other rolls 46 may guide the finished carpet 40 away from the chill roll 43 following contacting.

The invention now will be described in more detail with reference to the following non-limiting examples.

EXAMPLE 1

Beaulieu straight stitched greige carpet type, 24 inches wide was provided. Secondary backing material comprising heat set PET woven fibers with 45 threads per inch count in both the warp and weft directions was also provided (commercially available from Alice Manufacturing). Hot melt adhesive produced from PET modified with a modifying formulation in accordance with U.S. application Ser. No. 10/827,028 filed on Apr. 19, 2004, was provided. The hot melt adhesive had a viscosity of 35 centipoise at 325° F. and was mixed at equal parts per weight with a magnetite filler. The heating vessel and heated extrusion die were heated to 325° F. The heated application roll and heated doctor bar were heated to 335° F. The heated doctor bar was set 65 thousandths of an inch from the surface of the secondary backing material. The first unheated nip roll was set at a 250 thousandths of an inch gap from the heated application roll. The second unheated nip roll was set at a 90 thousandths of an inch gap from the heated application roll. The idler tension roll was set at a ¾ inch gap from the chill roll. The chill roll temperature was set at 70° F. The greige carpet and secondary backing material were fed to the application roll at a speed of 10 feet per minute. Wind-up roll tension was set at 3 pounds per linear inch.

EXAMPLE 2

Beaulieu straight stitched greige carpet type, 24 inches wide was provided. Secondary backing material comprising heat set PET woven fibers with 45 threads per inch count in both the warp and weft directions was also provided (commercially available from Alice Manufacturing). Hot melt adhesive produced from PET modified with a modifying formulation in accordance with U.S. Pat. No. 7,157,139, was provided. The hot melt adhesive had a viscosity of 35 centipoise at 325° F. and was mixed at equal parts per weight with a magnetite filler. The heating vessel and heated extrusion die were heated to 325° F. The heated application roll and heated doctor bar were heated to 335° F. The heated doctor bar was set 65 thousandths of an inch from the surface of the secondary backing material. The first unheated nip roll was set at a 250 thousandths of an inch gap from the heated application roll. The second unheated nip roll was set at a 90 thousandths of an inch gap from the heated application roll. The idler tension roll was set at a ¾ inch gap from the chill roll. The chill roll temperature was set at 70° F. The greige carpet and secondary backing material were fed to the application roll at a speed of 10 feet per minute. Wind-up roll tension was set at 3 pounds per linear inch.

EXAMPLE 3

Beaulieu straight stitched greige carpet type, 24 inches wide was provided. Secondary backing material comprising heat set PET woven fibers with 45 threads per inch count in both the warp and weft directions also was provided (commercially available from Alice Manufacturing). The hot melt adhesive described in Example 1 was used. The hot melt adhesive had a viscosity of 25 centipoise at 325° F. and was mixed at equal parts per weight with the same magnetite filler used in Example 1. The heating vessel and heated extrusion die were heated to 325° F. The heated application roll and heated doctor bar were heated to 330° F. The heated doctor bar was set 65 thousandths of an inch from the surface of the secondary backing material. The first unheated nip roll was set at a 250 thousandths of an inch gap from the heated application roll. The second unheated nip roll was set at a 90 thousandths of an inch gap from the heated application roll. The idler tension roll was set at a ¾ inch gap from the chill roll. The chill roll temperature was set at 70° F. The greige carpet and secondary backing material were fed to the application roll at a speed of 10 feet per minute. Wind-up roll tension was set at 3 pounds per linear inch.

The peel strength of the finished carpet produced in Examples 1-3 was so great that during testing destruction of the finished carpet occurred before delamination of the greige carpet and secondary backing material. It is thought that the penetration of the hot melt adhesive into the secondary backing material during application to the secondary backing material helps to achieve the great peel strength. Peel strength is an important quality of the finished carpet because, if the greige carpet and secondary backing material delaminates during use, then the greige carpet might peel loose from the secondary backing material that is fixed to the floor.

Embodiments of the invention provide a method of making a carpet tile without having to apply multiple coats of adhesive, and without significantly damaging the tufts of the carpeting material.

The high coating weights of hot melt adhesive achievable through practicing the embodiments also may avoid the necessity of applying multiple hot melt adhesive layers to achieve a given coating weight, thereby lowering manufacturing costs.

Additionally, practicing the embodiments may produce carpet wherein the fiber tufts are less likely to be in a non-perpendicular position relative to the primary backing fabric of the finished carpet. This may result in a generally higher-grade carpet product.

The embodiments have been described with reference to particularly preferred embodiments and examples. Those skilled in the art will appreciate that various modifications may be made to the invention without departing from the spirit and scope thereof.

We claim:

1. An apparatus for producing carpet, comprising:
   a heated application roll;
   a greige carpet roll positioned upstream of the heated application roll, the greige carpet roll being configured to feed a greige carpet to the heated application roll;
   a secondary backing material roll positioned upstream of the heated application roll, the second backing material roll being configured to feed a secondary backing material to the heated application roll; and
   a heated doctor bar for providing a hot melt adhesive to the secondary backing material, the heated doctor bar being disposed generally above a point of contact between the secondary backing material and the heated application roll and capable of metering an amount of hot melt adhesive contacted with the secondary backing material.

2. The apparatus of claim 1, wherein the heated doctor bar is configured to apply a smooth and continuous layer of the hot melt adhesive to the secondary backing material in a single application.

3. The apparatus of claim 1, further comprising a vacuum source configured to apply a vacuum to the hot melt adhesive effective to remove vapors therefrom.

4. The apparatus of claim 1, further comprising a greige carpet heater upstream of the heated application roll, the greige carpet heater being configured to heat the greige carpet before the greige carpet first contacts the secondary backing material.

5. The apparatus of claim 4, wherein the greige carpet heater comprises a radiant or infrared heater.

6. The apparatus of claim 4, wherein the greige carpet heater is configured to heat a back side of the greige carpet.

7. The apparatus of claim 1, further comprising at least one unheated nip roll positioned adjacent to the heated application roll where the greige carpet first contacts the heated application roll.

8. The apparatus of claim 7, wherein the at least one unheated nip roll is configured to draw the secondary backing material against the heated application roll.

9. The apparatus of claim 8, wherein the at least one unheated nip roll is adjustable such that an area of the heated application roll against which the secondary backing material is pressed is variable.

10. The apparatus of claim 7, wherein the at least one unheated nip roll is configured to press the greige carpet against the secondary backing material for at least 80 percent of a surface area of the heated application roll.

11. The apparatus of claim 7, wherein the at least one unheated nip roll is configured to press against a face side of the greige carpet and press a back side of the greige carpet against the secondary backing material on the heated application roll.

12. The apparatus of claim 1, further comprising:
a chill roll positioned downstream from the heated application roll; and
an idler tension roll positioned adjacent to the chill roll.

13. The apparatus of claim 12, wherein the idler tension roll is positioned at a distance from the chill roll such that fiber tufts of the greige carpet are able to reorient to a direction perpendicular to a primary backing fabric of the greige carpet before contacting the chill roll.

14. The apparatus of claim 12, wherein the idler tension roll is positioned at a distance from the chill roll such that at least 80 percent of fiber tufts of the greige carpet are oriented in a direction perpendicular to a primary backing fabric of the greige carpet before contacting the chill roll.

15. The apparatus of claim 12, wherein the idler tension roll is positioned at a distance from the chill roll such that at least 90 percent of fiber tufts of the greige carpet are oriented in a direction perpendicular to a primary backing fabric of the greige carpet before contacting the chill roll.

16. The apparatus of claim 12, wherein the idler tension roll is positioned at a distance from the chill roll such that at least 95 percent of fiber tufts of the greige carpet are oriented in a direction perpendicular to a primary backing fabric of the greige carpet before contacting the chill roll.

17. The apparatus of claim 1, further comprising a heated extrusion die extending the width of the heated application roll that delivers the hot melt adhesive to the heated doctor bar.

18. The apparatus of claim 1, further comprising a final roll for collecting a finished carpet, the final roll being positioned downstream from the chill roll.

19. An apparatus for producing finished carpet, comprising:
a heated application roll;
a means for providing a greige carpet to the heated application roll, the means being positioned upstream of the heated application roll;
a means for providing a secondary backing material to the heated application roll, the means being positioned upstream of the heated application roll;
a heated doctor bar for providing a hot melt adhesive to the secondary backing material, the heated doctor bar being disposed generally above a point of contact between the secondary backing material and the heated application roll and capable of metering an amount of hot melt adhesive contacted with the secondary backing material;
at least one unheated nip roll positioned adjacent to the heated application roll where the greige carpet first contacts the heated application roll;
a chill roll positioned downstream from the heated application roll;
an idler tension roll positioned adjacent to the chill roll; and
a means for collecting the finished carpet positioned downstream from the chill roll.

20. The apparatus of claim 19, further comprising a heated extrusion die extending the width of the heated application roll that delivers the hot melt adhesive to the heated doctor bar.

* * * * *